United States Patent
Robson

(10) Patent No.: US 6,179,346 B1
(45) Date of Patent: Jan. 30, 2001

(54) PIPE COUPLING DEVICE

(75) Inventor: Anthony Roy Robson, Rotherham (GB)

(73) Assignee: Royack Limited, Rotherham (GB)

( * ) Notice: Under 35 U.S.C. 154(b), the term of this patent shall be extended for 0 days.

(21) Appl. No.: 09/269,488

(22) PCT Filed: Sep. 30, 1997

(86) PCT No.: PCT/GB97/02641

§ 371 Date: Jun. 1, 1999

§ 102(e) Date: Jun. 1, 1999

(87) PCT Pub. No.: WO98/14729

PCT Pub. Date: Apr. 9, 1998

(30) Foreign Application Priority Data

Oct. 1, 1996 (GB) .................................................. 9620421

(51) Int. Cl.⁷ .................................................. F16L 37/18
(52) U.S. Cl. .......................... 285/314; 285/358; 285/321
(58) Field of Search .................................. 285/342, 314, 285/321, 339, 358, 359

(56) References Cited

U.S. PATENT DOCUMENTS

| | | | | |
|---|---|---|---|---|
| 996,023 | * | 6/1911 | McAdoo | 285/358 |
| 1,481,062 | * | 1/1924 | Johnson | 285/385 |
| 1,728,588 | * | 9/1929 | Bache | 285/358 |
| 3,083,042 | * | 3/1963 | Collar | 385/314 |
| 3,276,796 | * | 10/1966 | Daniel | 285/359 |
| 3,439,940 | * | 4/1969 | Nunlist | 285/314 |
| 3,635,501 | * | 1/1972 | Thorne-Thomsen | 285/34 |
| 4,412,694 | | 11/1983 | Rosenberg | 285/178 |
| 5,356,183 | * | 10/1994 | Cole | 285/305 |
| 5,697,652 | * | 12/1997 | Nishikawa | 285/314 |

FOREIGN PATENT DOCUMENTS

| | | | |
|---|---|---|---|
| 0 200 339 | 3/1986 | (EP) | 37/10 |
| 0 381 357 | 3/1990 | (EP) . | |
| 956480 | 6/1961 | (GB) . | |
| WO 90/08288 | 7/1990 | (WO) . | |

* cited by examiner

*Primary Examiner*—Teri Pham
(74) *Attorney, Agent, or Firm*—Workman, Nydegger & Seeley

(57) ABSTRACT

A releasable coupling device having a cam-type interengagement between the inner surface of a cap member and the outer surface of a gripping member. The coupling device including a primary arrangement of cams and guide surfaces engageable therewith, upon rotation of the cap member to the clamping position, so as to deform the gripping member radially inwardly to gripping engagement with the outer periphery of the second tubular component. A secondary arrangement of cams and guide surfaces is engageable therewith, upon rotation of the cap member to the clamping position, so as to take up any radial clearance which may develop between the inner surface of the cap member and the outer surface of the gripping member as a result of radial inward deformation of the gripping member by the primary arrangement of cams and guide surfaces.

14 Claims, 4 Drawing Sheets

PIPE COUPLING DEVICE

BACKGROUND OF THE INVENTION

1. Field of the Invention

This invention relates to a coupling device for joining together adjacent ends of two tubular components, such as two pipe ends.

2. Present State of the Art

Coupling devices are used to join together adjacent ends of tubular components, such as pipes, and must provide (a) a reliable securement together of the adjacent ends via the coupling device so as to resist separation and (b) a sealed joint to withstand leakage under pressure.

In addition to joining together two adjacent pipe ends, coupling devices can be used to join together other types of tubular components e.g. to connect an inlet or outlet pipe to a tubular fitting on a housing.

However, the present invention has been developed primarily in connection with the coupling together of large bore pipes of the type used by the gas and water supply industries. Pipes of this type are usually made of polyethylene, and large bore yellow gas pipes will be a familiar sight to motorists negotiating roadworks.

The commonly used method to connect together successive lengths of this type of pipe and/or of pipes to pipe fittings, involve heating of adjacent ends to partly melt the joining portions, pressing the joining portions so that they fuse together, and allowing the portions to cool and set as a unitary product. Electro-fusion may be used, thereby pipe fittings incorporate wound electrical wire coil resisters embedded in the socket, to provide a heating element used to fuse together pipe/fitting joints. In both types of permanent fusing together (butt and electro-fusion), electrical power is always required.

When electrical power is used, the need to achieve exacting operating and temperature conditions necessary to obtain reliable joints can only be provided by bulky, complex and expensive equipment. Furthermore, skilled operatives are needed, but even then it is difficult, if not impossible, to test the resulting joint integrity in situ, prior to commissioning.

Evidently, the quality and reliability of fused-together joints depends upon (1) operator skill, (2) quality of the materials used to make the joining components and (3) design tolerances in the manufacture of the joining components. It is also difficult to join together pipes of different materials of specifications. Imperfect standards in any single one of these three criteria can result in unacceptable joints, both from the point of view of leakage, and also for resistance to mechanical separation of the joint under load.

Furthermore, joints of this type are necessarily permanent, and therefore can only be un-made by cutting through the joined-together components (often requiring extensive groundworks to complete), and obviously this is not an easily releasable, and subsequently re-makable type of coupling. Also, cannot be assembled without completing the joint, which makes trial lay-outs difficult.

OBJECTS AND BRIEF DESCRIPTION OF THE INVENTION

The above draw-backs, in connection with permanent fusing together of pipe ends has been described as background information, and the invention seeks to provide a new type of mechanical joint for connecting together pipe ends. Although releasable mechanical type couplings are available for smaller diameter pipework, currently there is no reliable mechanical socket/spigot coupling available to cater for the significant tolerance bands and pull-loads (typically measured in tens of tonnes) in connection with large diameter pipe joints.

The invention therefore seeks to provide an improved design of coupling device, which is operative in order to provide a mechanical coupling, or uncoupling, of the adjacent ends of two tubular components, in a way which is mechanically simple to operate and which provides a mechanically reliable and substantially leak proof coupling together, even in the event of substantial variation in tolerances in diameter of the ends of the two components which are to be joined together.

The invention therefore utilises, essentially, a three component type of coupling device for connecting first and second tubular components together and which comprises:

1. an external cap member which is intended to be rotatable mounted on the first tubular component for angular movement between a release position and a clamping position, and which defines a central hole for receiving one end of the second tubular component;
2. an annular seal which is capable of being received by an internal seating in said first tubular component and which has a resiliently deformable sealing portion engageable with the outer periphery of said second tubular component upon entry of the latter through the hole in said external cap member; and,
3. a generally annular gripping member which is housed within said cap member and which is locatable adjacent to the annular seal, said gripping member having a cam-type of engagement with the inner surface of the cap member such that rotation of the cap member to the clamping position causes the gripping member to be moved radially inwardly into gripping engagement with the outer periphery of the second tubular component.

A coupling device as defined above will be referred to hereinafter as "a coupling device of the type set forth".

According to the invention, there is provided a coupling device of the type set forth, characterised in that the cam-type of interengagement between the inner surface of the cap member and the outer surface of the gripping member comprises:

a primary arrangement of cams and guide surfaces engageable therewith, upon rotation of the cap member to the clamping position, so as to deform the gripping member radially inwardly to gripping engagement with the outer periphery of the second tubular component; and, a secondary arrangement of cams and guide surfaces engageable therewith, upon rotation of the cap member to the clamping position, so as to take-up any radial clearance which may develop between the inner surface of the cap member and the outer surface of the gripping member as a result of radial inward deformation of the gripping member by the primary arrangement of cams and guide surfaces, and also applying additional gripping force to the second tubular component.

Therefore, upon tightening of the cap member to the clamping position, the primary and secondary cam arrangements and respective guide surfaces are jointly operative to apply inward deformation to the gripping member and into gripping engagement with the outer periphery of the second tubular component, while at the same time taking-up any radial clearance which may tend to develop between the outer surface of the gripping member and the inner surface of the cap member, as a result of the interaction between the guide surfaces and the cams of the primary arrangement.

Preferably, the primary and secondary cams are provided on the outer surface of the gripping member, and co-operative guide surfaces are formed on the inner surface of the cap member. However, these arrangements may be reversed; or indeed one of the sets of cams may be provided on the outer surface of the gripping member, and the other set of cams may be arranged on the inner surface of the cap member.

The outer surface of the gripping member preferably comprises first and second portions, in which the first portion is frusto-conical and increases in diameter in an axial direction inwardly of the coupling, and the second portion comprises a generally axially extending portion.

The primary cams are preferably arranged on the second portion, and the secondary cams are arranged on the first portion.

The primary cams may comprise three separate cam portions spaced circumferentially from each other by approximately 120°, and the secondary cams may comprise six cam portions spaced circumferentially from each other by about 60°.

The gripping member is preferably a split ring, which can be deformed circumferentially and radially.

Preferably, a spacer washer is positioned between the gripping member and the annular seal, to prevent damage and to prevent extrusion of the seal under pressure.

The cap member may comprise a frusto-conical portion, to overlie the frusto-conical portion of the gripping member, and an axially extending portion which overlies the axially extending portion of the gripping member, and also overlies the outer periphery of the end of the first tubular component on which it is to be rotatably mounted.

The cap member may be snap-fitted onto the outer end of the first tubular component, which permits rotation of the cap member on the first tubular component, but without any axial movement of the cap member.

Preferably, the arrangement is such that the angular movement of the cap member between the release position and the clamping position is through an arc of movement which is less than 90°, and preferably less than 60°. In a preferred arrangement, that arc of movement is about 50°.

A coupling device according to the invention is particularly suitable for use in clamping together adjacent ends of successive pipes of large bore, but it should be appreciated that the invention may be applied to couple together smaller diameter pipes and pipe fittings.

A coupling device according to the invention may be a releasable device, by providing a releasable interengagement between the cap member and the first tubular component. Alternatively, the coupling device may be used to form part of a permanent coupling between two tubular components, e.g. to provide a tamper-proof completed coupling, in which case preferably some fusing together (e.g. electrical heating) of adjoining components may take place after completion of a mechanical coupling via the coupling device of the invention.

BRIEF DESCRIPTION OF THE DRAWINGS

A preferred embodiment of coupling device according to the invention will now be described in detail, by way of example only, with reference to the accompanying drawings, in which.

DETAILED DESCRIPTION OF THE PREFERRED EMBODIMENT

Figure 1:
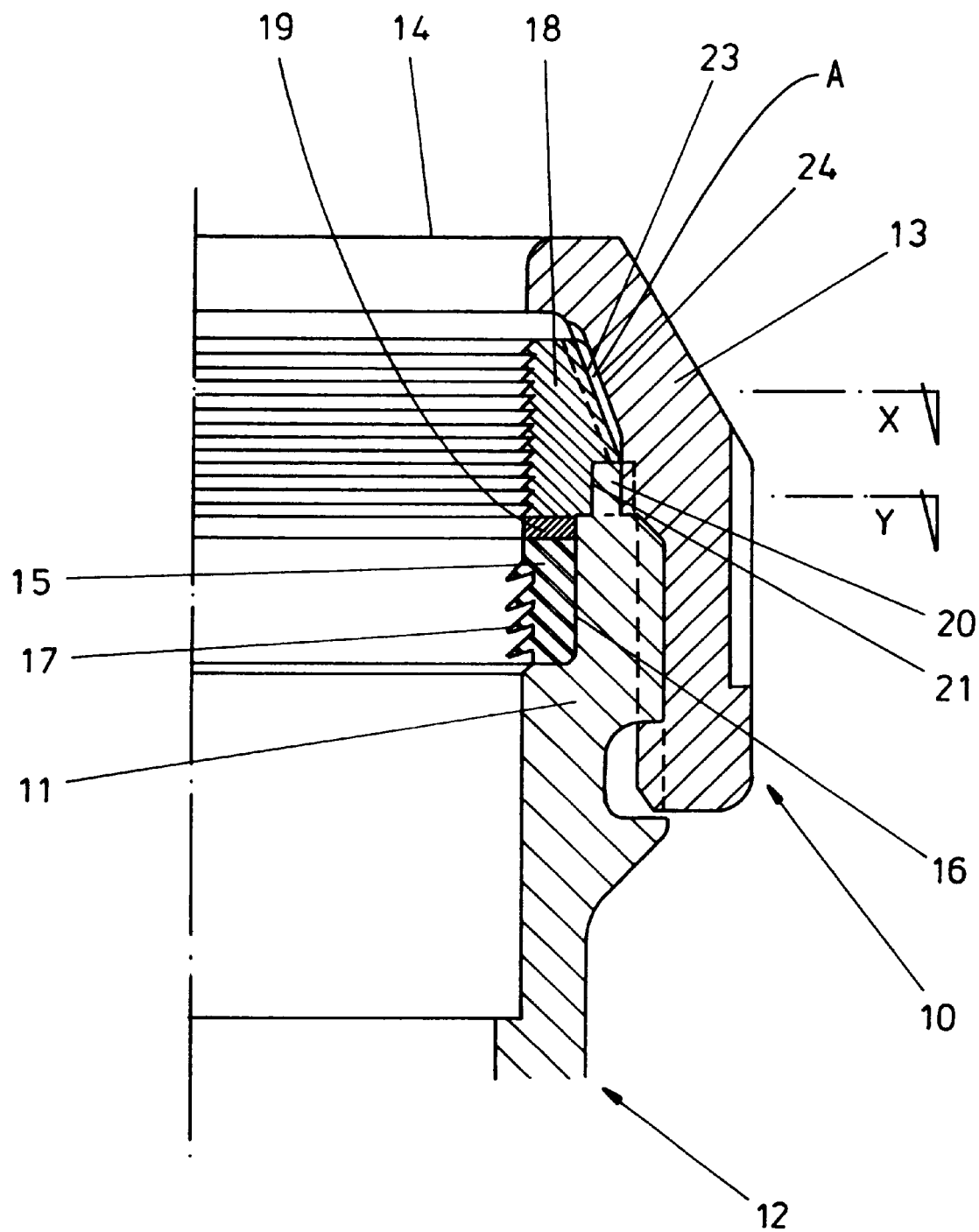
FIG. 1 is a longitudinal sectional view of a releasable coupling device, mounted on one end of a first tubular component, and adapted to receive a second tubular component which is to be coupled with the first tubular component via the coupling device.

Referring now to the drawings, a preferred embodiment of coupling device according to the invention is designated generally by reference 10, and is shown rotatably mounted on an enlarged end 11 of a first tubular fitting designated by reference 12. The pipe fitting 12 may comprise a length of pipe, or may take other forms of pipe fitting which may be incorporated in a pipeline e.g. a gas or water pipeline. A second tubular component (not shown) can be coupled with the first tubular component 12, via the coupling device 10, and in such a way that the two adjacent ends of the tubular components are clamped tightly against separation one from another, and also in a substantially leak proof manner.

The coupling device 10 is a three component type of device, and of which the first component comprises an external cap member 13 which is intended to be rotatably mounted on the end 11 of the first tubular component 12, for angular movement between a release position and a clamping position. The cap member 13 defines a central hole 14 for receiving one end of the second tubular component (not shown).

The second component of the coupling device 10 comprises a resiliently deformable annular seal 15 which is capable of being received by an internal seating or socket 16 in the first tubular component 12. The seal 15 has an inwardly projecting resiliently deformable sealing portion, taking the form of a series of tongues or lips 17, which are engageable with the outer periphery of the second tubular component, upon entry of the latter through the hole 14 in the external, cap member 13.

The third component of the coupling device 10 comprises a generally annular gripping member 18 which is housed within the cap member 13, and is locatable adjacent to the annular seal 15, with a thrust washer 19 located therebetween. The gripping member 18 has a cam-type of engagement between its outer surface and the inner surface of the cap member 13, such that rotation of the cap member 13 to the clamping position causes the gripping member 18 to be moved radially inwardly into gripping engagement with the outer periphery of the second tubular component.

The cam-type of interengagement between the inner surface of the cap member 13 and the outer surface of the gripping member 18 comprises primary and secondary arrangements of cams and co-operative guide surfaces. The primary arrangement comprises a set of three primary cams 20, which are circumferentially spaced from each other by 120°, as shown in FIG. 3, and which are located on a generally axially extending portion 21 of the gripping member 18. The cams 20 are engageable with co-operative guide surfaces on the inside surface of the cap member 13, one of which can be seen in the right hand sectional view of FIG. 2, and designated by reference 22.

Rotation of the cap member 13 from the release position to the clamping position causes the primary cam 20 and co-operative guide surface 22 to interengage, and thereby to deform the gripping member 18 radially inwardly and into gripping engagement with the outer periphery of the second tubular component.

The gripping member 18 also includes, in addition to the axially extending portion 21, a frusto-conical portion 23, of which its diameter increases in a direction axially inwardly of the coupling device. The cap member 13 has a corresponding frusto-conical inside surface portion 24, which overlies the frusto-conical outer surface 23 of the gripping member 18.

As described above in relation to the primary cams 20, rotation of the cap member 13 to the clamping position results in radially inward deformation of the gripping member 18. However, in the event of possible variation in actual external dimensions of the two tubular components to be joined together, arising as a result of varying tolerances, it is possible that the radial inward deformation applied to the gripping member 18 by the action of the primary cams 20 may be such as to cause the entire gripping member 18 to move radially inwardly until it comes into gripping contact with the outer periphery of the second tubular component, and in some circumstances which could tend to create a substantial clearance gap, shown by reference A, between the frusto-conical surfaces 23 and 24. However, a secondary arrangement of cams and guide surfaces is provided, in the overlapping frusto-conical regions of the cap member 13 and the gripping member 18, and which has the purpose, upon rotation of the cap member 13, of taking-up any radial clearance A which may develop between the inside surface of the cap member 13 and the outer surface of the gripping member 18.

Figure 2:
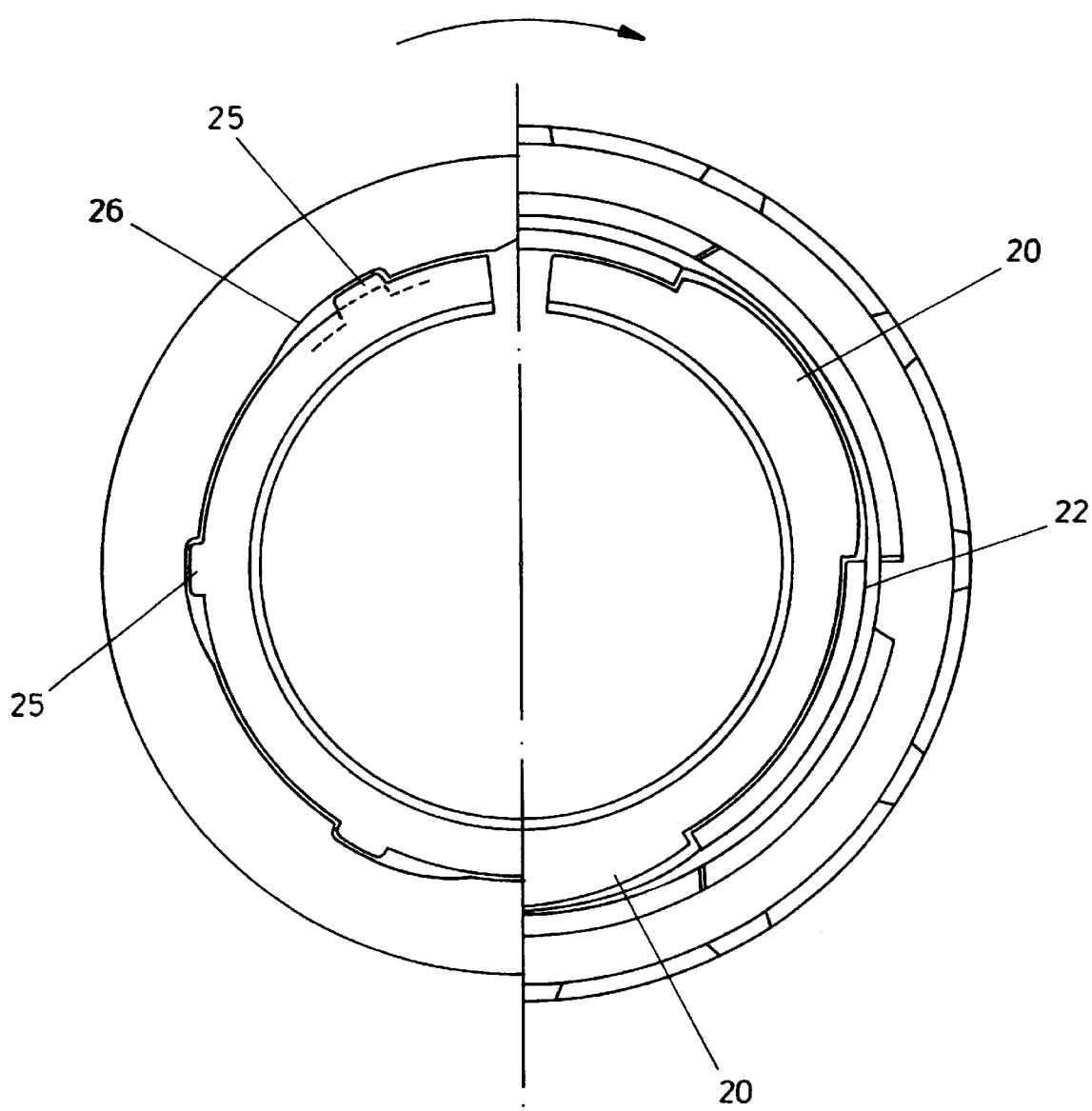
FIG. 2 is a two part transverse sectional view, with one part being taken on section line X—X in FIG. 1, and the other part being taken on Y—Y in FIG. 1.
Figure 4:
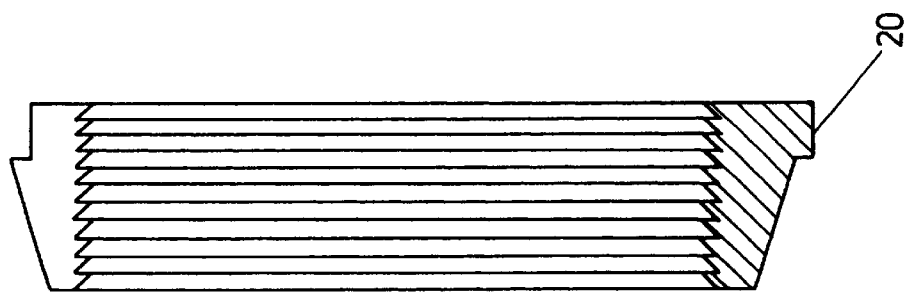
FIG. 4 is a sectional view taken on the section line Z—Z in FIG. 3.
Figure 3:
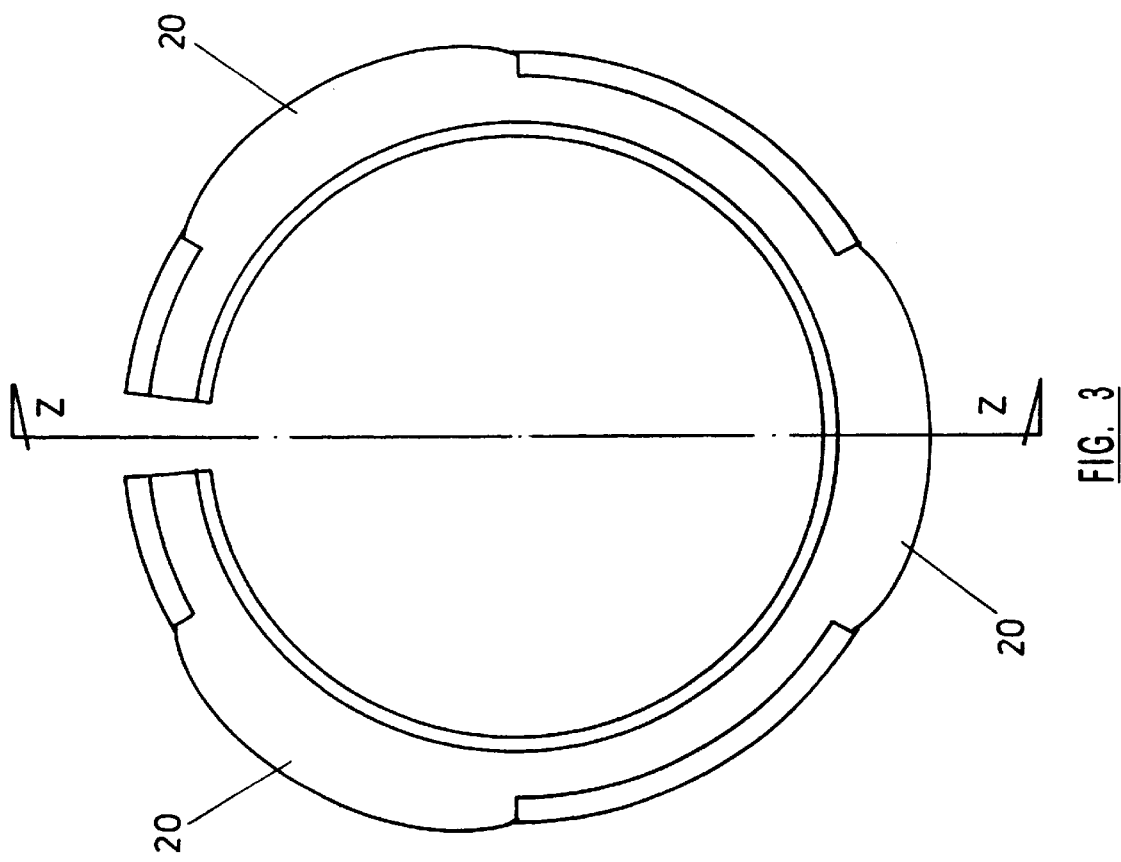
FIG. 3 is an end view of a generally annular gripping member of the coupling device.
Figure 6:
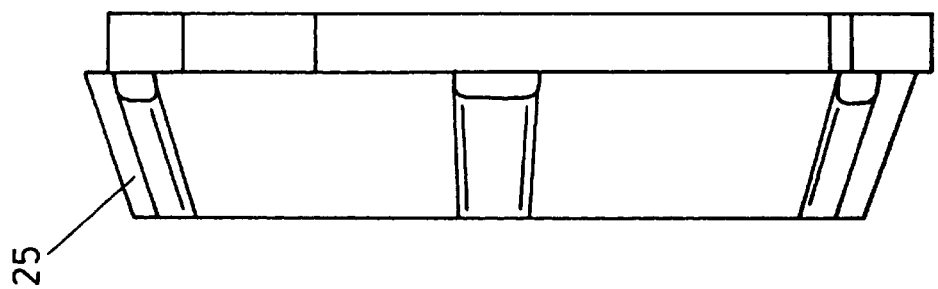
FIG. 6 is a view taken in the direction of the arrow C in FIG. 5.
Figure 5:
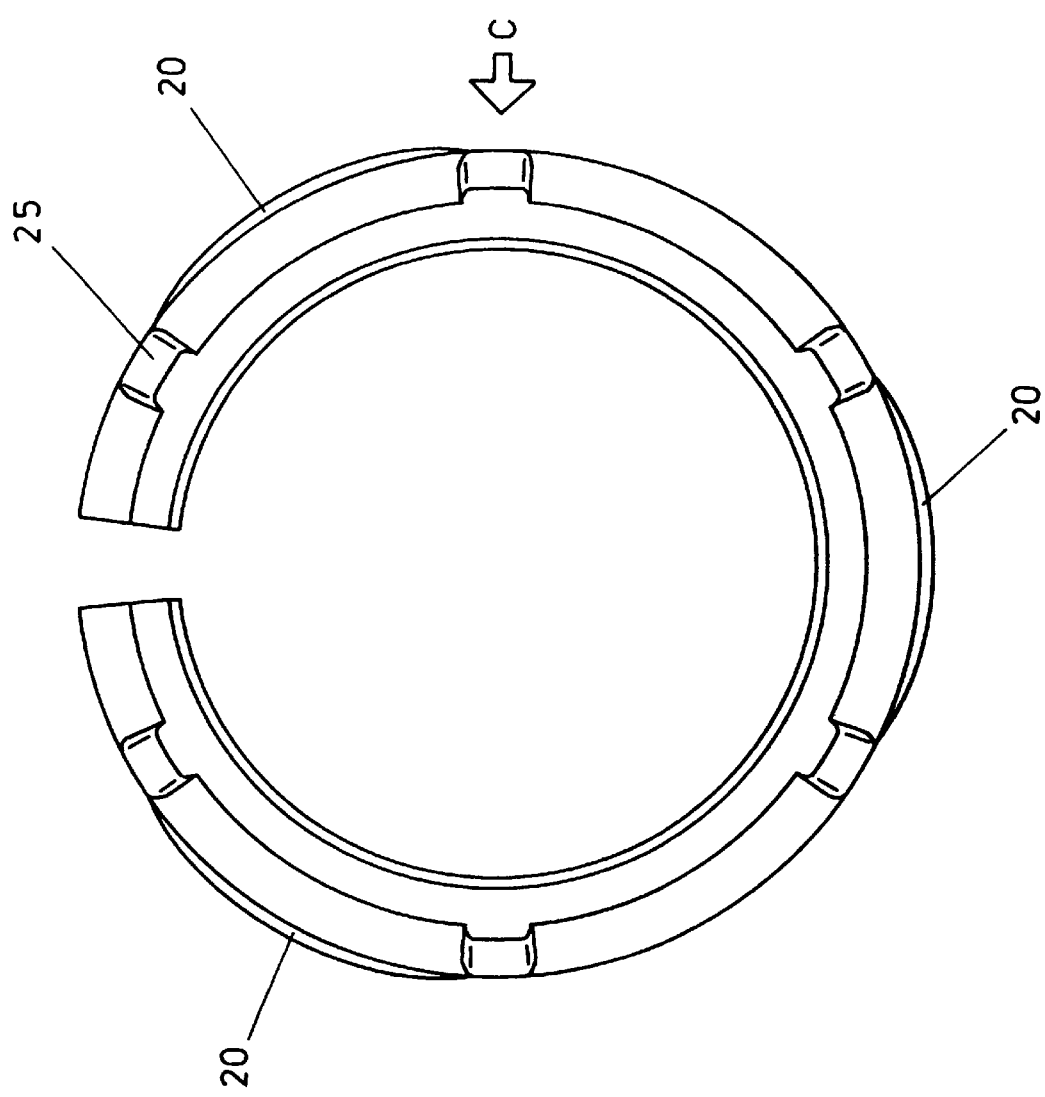
FIG. 5 is an opposite end view of the gripping member.

The secondary arrangement of cams and guide surfaces can be seen in FIGS. 5 and 6, and also in the left hand half of FIG. 2. A set of six secondary cams 25 is arranged at circumferentially spacing from each other by about 60°, on the sloping shoulder or frusto-conical portion 23 of gripping member 18. An internal guide surface 26 on the frusto-conical inner surface of the cap member 13 co-operates with the secondary cams 25, upon rotation of the cap member, so as to take-up any clearance A, and also to apply radial deformation.

By means of the joint co-operation between the primary and secondary cam arrangements, a reliable mechanical coupling can be achieved between the two ends of the tubular components, and in a substantially leak proof manner, even in the event of substantial variation in diameter of the ends of the tubular components, arising as a result of the design manufacturing tolerances.

The coupling device 10 is particularly suitable for use with large bore polyethylene pipes, of the type used by the gas and water industries. However, it should be understood that the coupling device is applicable to smaller bore diameter of pipes, and in other industries conveying different types of liquid or gas.

The coupling device 10 provides a unique mechanically operated arrangement having powerful cams which can apply the necessary closing force required, for only a small angular rotation of the external cap member 13, and typically the angular movement between the two positions will be less than 90°, and preferably about 50°. Once the cams are locked, the gripping member 18 can engage a tapered sleeve, which tightens further in response to any applied load or internal pressure.

A dynamic seal arrangement prevents leakage from both negative and positive pressure.

The fitting is demountable, and re-usable, and can also be adapted as a slip collar coupling, thereby providing a much faster and cheaper method of pipe line repair, than the known fusion fitting technique. Further, the pipe coupling obtained with use of the invention can be pressure tested in situ, if required. It is expected that the coupling device will be applicable for use with pipe sizes in the range of 90 to 250 mm diameter.

The coupling device 10 therefore combines the benefits of simple, single axis cap rotation, with the benefits of a self-tightening slip collar. The first provides a grip on the pipe, and the second is able to compensate for further pipe distortion under load.

The secondary cam arrangement is able to compensate for any potential generation of a sizeable clearance gap, shown by reference A in FIG. 1, and which would otherwise allow the entire pipe and grip ring to move laterally to fill the gap, upon application of pressure to the pipeline, and which is not permitted on underground gas and liquid pipelines. However, the secondary cams act on the tapered section, operated by mating cams on the tapered portion of the cap member, as shown in FIG. 2. This has the added advantages of providing an axial driving force along the length of the gripping member. Once closed, the secondary cams are left in contact with the tapered face of the cap member in a position to provide further gripping force under applied load.

Preferably, the gripping member 18 is a split ring, as shown in FIG. 2, whereby it can deform both circumferentially, and radially, as the external cap member is rotated between the release and coupling positions. Movement to the coupling position applies a deforming force to the gripping member, whereas movement of the cap member to the release position allows the gripping member, under its own resilience, to expand circumferentially and radially to take-up release position, allowing mechanical uncoupling of the joint.

The preferred embodiment of the invention utilises an external cap member which does not carry out any axial movement, when it rotates between the release and coupling positions. Furthermore, the gripping member also does not move axially, but only can be deformed radially inwards upon rotation of the external cap member. This means that the mechanical advantages created by the cam arrangement is utilised to drive the gripping member radially inwards. This is different from known compression joints, in which it is essential for some axial movement to take place. In the use of a coupling device according to the invention, rotation of the external cap member is in a single plane, between carefully defined limits, and which effectively limits the artisan skill which is required.

Furthermore, once the primary and secondary came have been actuated into gripping contact with the connected pipe, the secondary cams are left aligned in contact with the frusto-conical portion, such that any applied load on the pipe (pull-out or internal pressure) will have the effect of driving the gripping member (grip ring) in a wedging action into further gripping action on the pipe. It is the combination of these three mechanisms (primary cams, secondary cams and the wedge effect) which provides sufficient movement in the grip ring to cater for the larger tolerance bands found in joining together large bore pipes.

The secondary cams provide, inter alia, three advantageous features:

1. they ensure the closing action of the grip ring initiated by the primary cams is transmitted the full length of the grip ring;
2. they fill the gap otherwise created by closure of the primary cams, preventing any major movement of the grip ring and pipe out of the socket to fill such a gap, that would otherwise occur; and,
3. they provide an interface between cap and grip ring to initiate the additional wedging action under applied load.

The feature of single action rotation of the cap member through less than 60° provides scope for a simple closure tool which, combined with the releasable feature, as preferred, will enable repair and replacement without major groundworks as required at present.

What is claimed is:

1. A releasable coupling device for use with a tubular component, the coupling device comprising:

a tubular pipe fitting;

a tubular cap member having a first end, an opposing second end, and an interior surface extending therebetween, the first end of the cap member being configured to couple with the pipe fitting so as to selectively rotate between a release position and a clamping position, the second end of the cap member having hole configured to receive the tubular component, the interior surface of the cap member including a first portion and a second portion;

a generally annular gripping member disposed within the cap member, the gripping member having an interior surface and an exterior surface, the interior surface of the gripping member being configured to receive the tubular component, the exterior surface of the gripping component including a frusto-conical first portion and a generally axially extending second portion;

a primary cam disposed on one of the second portion of the cap member or second portion of the gripping member with a complementary primary guide surface disposed on the other of the second portion of the cap member or second portion of the gripping member, the primary cam engaging the primary guide surface so as to deform the gripping member radially inward when the cap member is moved to the clamping position; and a secondary cam disposed on one of the first portion of the cap member or frusto-conical first portion of the gripping member with a complementary secondary guide surface disposed on the other of the first portion of the cap member or frusto-conical first portion of the gripping member, the secondary cam engaging the secondary guide surface so as to take-up any radial clearance which may develop between the interior surface of the cap member and the exterior surface of the gripping member when the cap member is moved to the clamping position.

2. A reasonable coupling device as recited in claim 1, further comprising three primary cams circumferentially spaced apart by approximately 120 degrees.

3. A releasable coupling device as recited in claim 1, further comprising six secondary cams circumferentially spaced apart by approximately 60 degrees.

4. A releasble coupling device as recited in claim 1, wherein the gripping member is a split ring which can be deformed circumferentially and radically.

5. A releasble coupling device as recited in claim 1, wherein the first portion of the tubular cap is frusto-conical.

6. A releasble coupling device as recited in claim 1, wherein the second portion of the tubular cap is axially extending.

7. A releasble coupling device as recited in claim 1, wherein the cap member is configured to snap-fit onto the pipe fitting so as to permit rotation of the cap member on the pipe fitting without axial movement of the cap member.

8. A releasble coupling device as recited in claim 7, wherein the cap member is rotatably adjustable between the release position and the clamping position through an arc of movement which is less than 90 degrees.

9. A releasble coupling device as recited in claim 8, wherein the arc of movement is less than 60 degrees.

10. A releasble coupling device as recited in claim 1, further comprising a tubular seal disposed within the pipe fitting, the tubular seal having an interior surface.

11. A releasble coupling device as recited in claim 10, further comprising a plurality of sealing lip inwardly projecting from the interior surface of the tubular seal.

12. A releasble coupling device as recited in claim 10, further comprising a thrust washer disposed between the tubular seal and the gripping member.

13. A releasble coupling device as recited in claim 1, further comprising a plurality of sealing lip inwardly projecting from the interior surface of the gripping member.

14. A releasble coupling device as recited in claim 1, wherein the pipe fitting comprises a pipe.

* * * * *